United States Patent [19]

Trauscht et al.

[11] Patent Number: 5,765,882

[45] Date of Patent: Jun. 16, 1998

[54] AUTOMOBILE DECKLID POP-UP BUMPER

[75] Inventors: James R. Trauscht, Downers Grove; Philip A. Taylor, New Lenox, both of Ill.

[73] Assignee: Illinois Tool Works Inc., Glenview, Ill.

[21] Appl. No.: 575,525

[22] Filed: Dec. 20, 1995

[51] Int. Cl.[6] .................................................. F05C 17/04
[52] U.S. Cl. ............................... 292/1; 292/DIG. 72
[58] Field of Search ............................ 292/1, DIG. 72; 180/69.2, 69.23; 296/76; 248/188.4, 354.6, 188.2, 188.3; 411/247, 255, 301

[56] References Cited

U.S. PATENT DOCUMENTS

| | | | |
|---|---|---|---|
| 545,277 | 8/1895 | Feinberg | 292/DIG. 72 |
| 1,071,134 | 8/1913 | Bedard | 292/DIG. 72 |
| 1,341,518 | 5/1920 | Ragsdale | 292/DIG. 72 |
| 1,344,095 | 6/1920 | Skala | 180/69.2 |
| 1,466,954 | 9/1923 | Ollard | 292/DIG. 72 |
| 1,643,349 | 7/1927 | Baruch | 292/DIG. 72 |
| 2,227,144 | 12/1940 | Krause | 292/1 |
| 2,775,849 | 1/1957 | Ingram | 248/188.3 |
| 2,795,892 | 6/1957 | Lautenbacher et al. | 248/188.3 |
| 4,653,968 | 3/1987 | Rapata et al. | 411/247 |
| 5,465,875 | 11/1995 | Garnett | 222/148 |
| 5,540,709 | 7/1996 | Ramel | 606/183 |
| 5,543,767 | 8/1996 | Elenbass | 335/205 |

*Primary Examiner*—Steven N. Meyers
*Assistant Examiner*—Stephen J. Pentlicki
*Attorney, Agent, or Firm*—Kane, Dalsimer, Sullivan, Kurucz, Levy, Eisele and Richard, LLP

[57] ABSTRACT

An automobile decklid pop-up bumper for assembly with an apertured workpiece, such as the framework of an automobile engine compartment having an aperture and a helical internal marginal portion defined around the aperture, includes a housing with an enlarged end portion for engaging the automobile hood and a shank portion extending from the enlarged end portion adapted to be received through the aperture. The shank portion has a helical thread for threadingly engaging the helical marginal portion around the aperture when the bumper is assembled with the workpiece. The housing has an axial bore with a portion of reduced radius within the enlarged end portion. The portion of reduced radius defines a shoulder. Disposed within the axial bore is a plunger having an elongated cylindrical portion and a disk-like base, the elongated cylindrical portion extending through the portion of reduced radius and the disk-like base interfering with the shoulder to prevent the plunger from passing completely through the axial bore. Biasing means direct the elongated cylindrical portion out through the enlarged end portion of the housing, and enable the plunger to raise the hood by a slight amount when the hood latch mechanism is released.

17 Claims, 2 Drawing Sheets

5,765,882

AUTOMOBILE DECKLID POP-UP BUMPER

BACKGROUND OF THE INVENTION

1. Field of the Invention

The present invention relates to adjustable abutment assemblies, and, more particularly, to a hood bumper assembly arranged to adjustably engage the hood of an automobile as it is brought down into a locked position over the automobile engine compartment. More particularly still, the present invention relates to a hood bumper assembly incorporating a spring-loaded plunger biased to lift the hood by a small amount when the hood latch mechanism is released.

2. Description of the Prior Art

Adjustable abutments are used in many environments, as, for example, in the form of hood bumper assemblies. Such assemblies are usually provided in the engine compartment of an automobile and include an abutment member arranged to engage the hood when the hood is brought down to a locked position. In the usual case, at least two abutment members are provided at respective sides of the engine compartment to vertically align the hood with the automobile fenders when the hood is closed.

Abutment assemblies of the prior art for such use have included a workpiece, which may, for example, be the frame of the engine compartment, having an aperture formed therein which is coined or otherwise deformed to define a helical thread about the aperture. An abutment member having an enlarged end and a threaded shank portion extending from the enlarged end is arranged to be threadingly received by the aperture. The abutment member is rotated into the aperture by a sufficient number of revolutions so that the enlarged end is at a desired position to align the hood when closed. Also, indentations about the aperture have been provided in the engine compartment frame to enable the relatively thin sheet metal into which the aperture is formed to receive abutment members having relatively large threads.

Such prior art hood bumper assemblies exhibit the deficiency that, after numerous closings of the hood, the vibration caused by the closing of the hood can cause the threaded abutment member to rotate in the aperture and thus become misadjusted. As a result, after such numerous hood closings, the prior art abutment members do not properly align the hood with the adjacent fenders. Further, prior art abutment members have had a flat end surface for engaging the underside of the hood. Such flat engaging surfaces allow the hood to vibrate laterally during automobile movement and do not positively locate the hood in the proper lateral position upon being closed.

To address these problems in the hood bumper assemblies of the prior art, the hood bumper assembly shown in U.S. Pat. No. 4,653,968 to Rapata et al., the teachings of which are incorporated herein by reference, has an adjustable rotatable abutment member whose rotation, after being adjusted, is precluded notwithstanding the vibrations caused by the closing of the automobile hood. The abutment member is also capable of preventing lateral hood vibration and positively locating the hood in its proper lateral position upon being closed.

To these ends, the hood bumper assembly shown in U.S. Pat. No. 4,653,968 comprises a workpiece including an aperture and a helical internal marginal portion defined around the aperture, and an abutment member having an end portion arranged to engage the hood when closed and a shank portion extending from the end portion including a helical thread for being threadingly received by the aperture, and detent means including first means carried by the shank portion in the forms of ribs and second means carried by the work piece in the form of indentations and arranged to cooperate with the first means for releasably locking the shank within the aperture against rotation at predetermined rotational intervals of the shank portion. The abutment member end portion includes a spherical surface portion for coacting with a stamped recess in the underside of the hood to prevent lateral hood vibration and to provide repeated lateral alignment of the hood upon each closure thereof.

Notwithstanding the advantages of the hood bumper assembly of U.S. Pat. No. 4,653,968, there is still a need in the art for a hood bumper assembly of the same type which includes a means for lifting the hood by a small amount when the hood latch mechanism is released. The present invention, which may be viewed as an improvement upon that shown in U.S. Pat. No. 4,653,968, meets this need.

SUMMARY OF THE INVENTION

Accordingly, the present invention is an automobile decklid pop-up bumper for assembly with an apertured workpiece having a substantially helical marginal portion defining the aperture and a first plurality of abutment means at circumferentially spaced intervals on the helical marginal portion.

The bumper includes a housing having an enlarged end portion for engaging a hood or the like, and a shank portion extending from the enlarged end portion and adapted to be received through the aperture. The shank portion includes a helical thread for threadingly engaging the helical marginal portion around the aperture in the workpiece when the bumper is assembled with the workpiece. The shank portion includes a second plurality of abutment means at circumferentially spaced intervals engageable with the first plurality of abutment means on the helical marginal portion for releasably locking the bumper against rotation with respect to the workpiece. The circumferentially spaced intervals of the first plurality of abutment means are unequal to the circumferentially spaced intervals of the second plurality of abutment means, so that the angular spacing between successive locking positions of the bumper are circumferentially spaced a distance less than the circumferentially spaced intervals of either the first or second plurality of abutment means.

The housing also has an axial bore with a portion of reduced radius within the enlarged end portion. The portion of reduced radius defines a shoulder within the axial bore. A plunger having an elongated cylindrical portion and a disk-shaped base of greater diameter than the elongated cylindrical portion is disposed within the axial bore. As so disposed, the elongated cylindrical portion extends through the portion of reduced radius of the axial bore, and the disk-shaped base interferes with the shoulder to prevent the plunger from passing completely through the axial bore.

Means for biasing the disk-shaped base of the plunger toward the shoulder are included in the housing, and lift the hood by a small amount when the hood latch mechanism is released.

The present invention will now be described in more complete detail with frequent reference being made to the drawing figures identified below.

DETAILED DESCRIPTION OF THE PREFERRED EMBODIMENT

Figure 1:
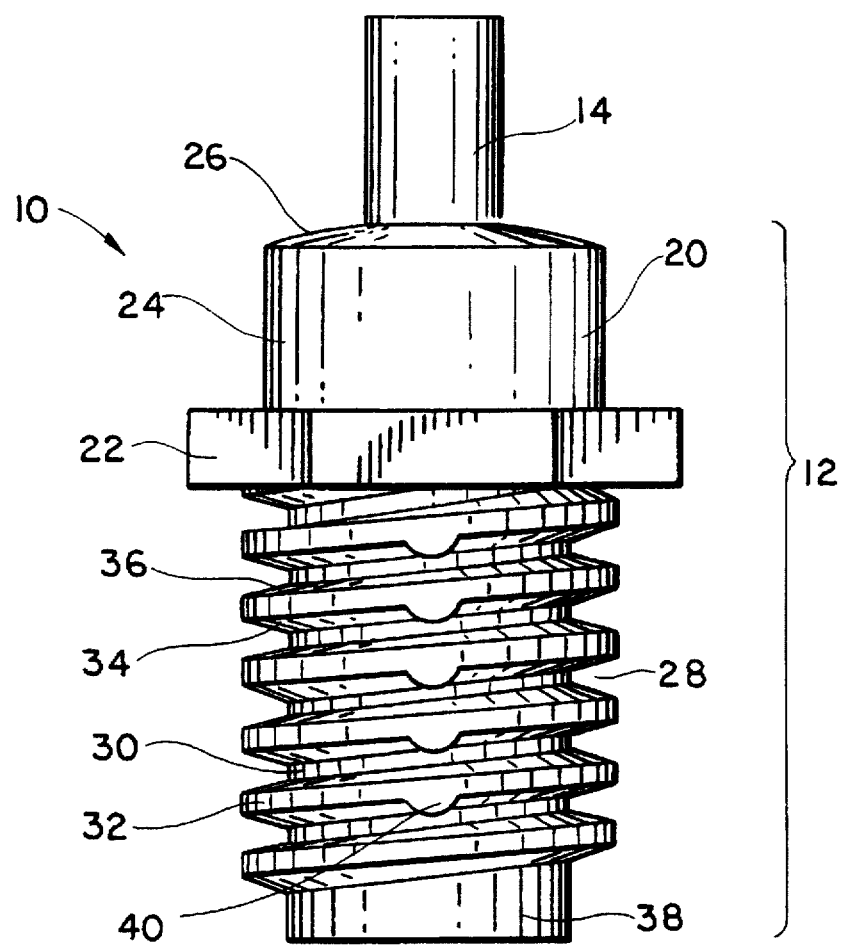
FIG. 1 is a side plan view of the automobile decklid pop-up bumper of the present invention.

FIG. 1 is a side plan view of the automobile decklid pop-up bumper 10 of the present invention. The bumper 10 comprises a housing 12 and, extending from within the housing 12, a plunger 14. The housing 12 includes an enlarged end portion 20 having a hexagonal nut portion 22, a cylindrical portion 24, and a raised generally spherical surface portion 26 on the cylindrical portion 24 opposite the hexagonal nut portion 22. The raised generally spherical surface portion 26 is arranged to engage the undersurface of the hood of an automobile when closed.

Extending from the end portion 20 is a shank portion 28 which includes a root 30. Upon the root 30 there is formed a helical thread 32 having a plurality of leading flanks 34 and a plurality of trailing flanks 36.

The housing 12 also includes a nose portion 38 which is an extension of the shank portion 28 and has a diameter equal to the diameter of the root 30. The nose portion 38 is provided to lead the bumper 10 into a helical impression and aperture in a workpiece.

The housing 12 is preferably formed by a molding operation of a material having an elastomeric characteristic such as, for example, nylon.

As can clearly be seen in FIG. 1, the leading flanks 34 of the helical thread 32 are provided with a plurality of ribs 40 which are carried by the leading flanks 34 and extend radially outwardly from the root 30 of the shank portion 28. Preferably, at least two such ribs are provided for each turn of the helical thread 32 and are unequal in number to the number of indentations formed about the aperture into which the bumper 10 is disposed. Alternatively, four such ribs 40 per turn of the helical thread 32 may be provided. The ribs 40 constitute a second plurality of means separated at predetermined circumferentially spaced intervals. The ribs 40 releasably lock the bumper 10 against rotation in a helically rimmed aperture provided with a plurality of indentations, said plurality of indentations beings a first plurality of means separated at predetermined circumferentially spaced intervals about the helically rimmed aperture. The number of ribs 40 provided is generally different from the number of indentations.

The ribs 40 extend from the crest of the helical thread 32 to the root 30. The ribs 40 could, however, terminate tangent to the root 30 or just short of the root 30. In either of these alternative constructions, the bumper 10 will function as required.

Figure 2:
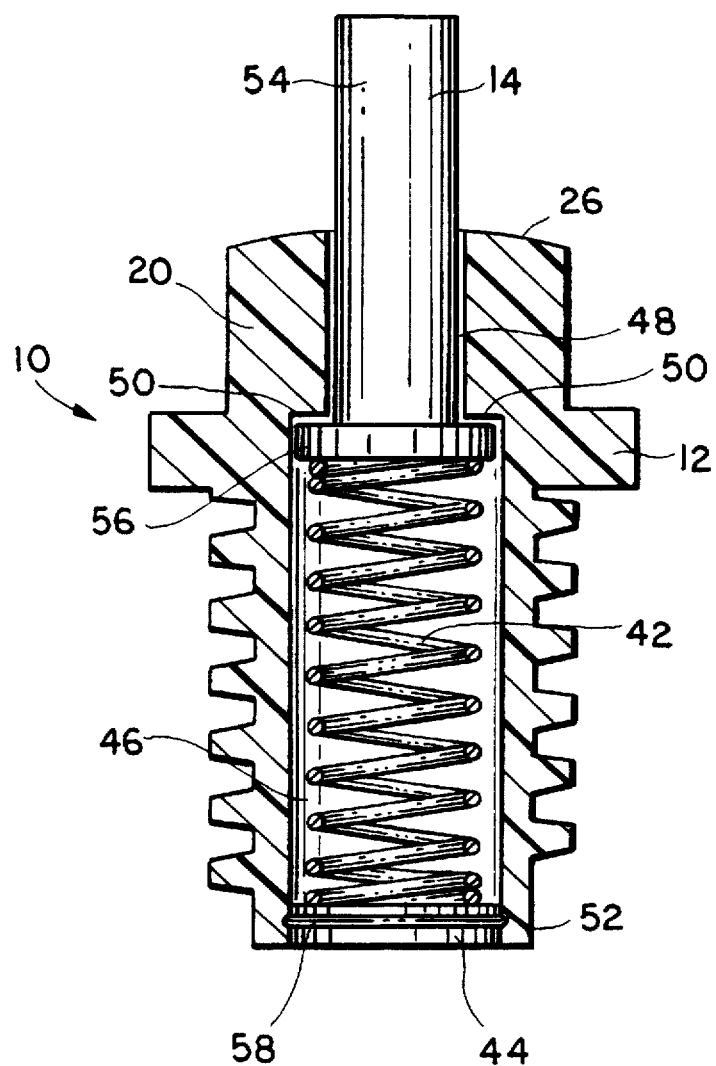
FIG. 2 is a partial cross-sectional view of the automobile decklid pop-up bumper.

FIG. 2 is a partial cross-sectional view of the automobile decklid pop-up bumper 10. The bumper 10 may be seen to additionally comprise a helical spring 42 and a cap 44.

As is apparent in FIG. 2, housing 12, which is the sole element presented in cross section, has an axial bore 46 with a reduced radius portion 48 defining a shoulder 50. At the opposite end of the axial bore 46 from the shoulder 50 is a groove 52 running circumferentially about the surface thereof.

Plunger 14 is disposed within axial bore 46 and comprises an elongated cylindrical portion 54 and a disk-shaped base 56 of greater diameter than portion 54. By interfering with disk-shaped portion 56, shoulder 50 prevents plunger 14 from passing completely through axial bore 46.

Plunger 14 is preferably molded from a polymeric resin material, such as an acetal resin or a nylon resin.

Helical spring 42 is disposed in axial bore 46, where it is compressed against disk-shaped base 56 of plunger 14 when cap 44 seals it therein. Cap 44, also essentially disk-shaped, has a circumferential flange 58 enabling it to snappingly seal the axial bore 46 through the interference fit of flange 58 within groove 52. Alternatively, or additionally, cap 44 may be sonically welded in place.

Spring 42, preferably made of steel, biases the plunger 14 outward from the axial bore 46, as it is compressed between disk-shaped base 56 and cap 44. Elongated cylindrical portion 54 of plunger 14 protrudes through the center of the spherical surface portion 26 of the enlarged end portion 20 of housing 12, but is even with spherical surface portion 26 when the hood of an automobile is closed upon it and latched.

Cap 44 is preferably molded from a reinforced polymeric resin material, such as 30% glass-filled nylon black.

From the foregoing, it can be appreciated that the present automobile decklid pop-up bumper 10 provides a new and improved hood bumper assembly compared with that shown in U.S. Pat. No. 4,653,968. By virtue of the spring-biased plunger 14 incorporated in the bumper 10, the elongated cylindrical portion 54 of which is compressed within axial bore 46 when the automobile hood is closed and latched, the hood may be lifted by a small amount when the latch mechanism is released, enabling the hood to be grasped more easily for complete raising.

While a particular embodiment of the present invention has been shown and described, modifications may be made. It is therefore intended to cover in the appended claims all such changes and modifications which fall within the true spirit and scope of the invention.

What is claimed is:

1. An automobile decklid pop-up bumper for assembly with an apertured workpiece having a substantially helical marginal portion defining the aperture, a first plurality of abutment means at circumferentially spaced intervals on said helical marginal portion, said bumper comprising a housing having an enlarged end portion for engaging a hood and a shank portion extending from said enlarged end portion and adapted to be received through said aperture, said shank portion including a helical thread for threadingly engaging the helical marginal portion around the aperture in the workpiece when the bumper is assembled with the workpiece, said shank portion including a second plurality of abutment means at circumferentially spaced intervals engageable with said first plurality of abutment means on said helical marginal portion for releasably locking said bumper against rotation with respect to the workpiece, the circumferentially spaced intervals of said second plurality of abutment means being unequal to the circumferentially spaced intervals of said first plurality of abutment means, said housing further having an axial bore with a portion of reduced radius within said enlarged end portion, wherein said portion of reduced radius defines a shoulder within said axial bore, said bumper further comprising:

a plunger, said plunger having an elongated cylindrical portion and a disk-shaped base of greater diameter than said elongated cylindrical portion, said plunger being disposed within said axial bore such that said elongated cylindrical portion extends through said portion of reduced radius and said disk-shaped base interferes with said shoulder to prevent said plunger from passing completely through said axial bore; and means for biasing said disk-shaped base of said plunger toward said shoulder.

2. An automobile decklid pop-up bumper as claimed in claim 1 wherein said means for biasing said disk-shaped base of said plunger toward said shoulder comprises:

a spring disposed within said axial bore against said disk-shaped base of said plunger; and a means for compressing said spring against said disk-shaped base.

3. An automobile decklid pop-up bumper as claimed in claim 2 wherein said means for compressing said spring against said disk-shaped base is a cap secured over said axial bore.

4. An automobile decklid pop-up bumper as claimed in claim 3 wherein said cap is sonically welded over said axial bore.

5. An automobile decklid pop-up bumper as claimed in claim 3 wherein said cap is a disk having a circumferential flange and said axial bore has a circumferential groove, so that said cap may be snappingly engaged within said axial bore by the interference fit between said flange of said cap and said groove of said axial bore.

6. An automobile decklid pop-up bumper as claimed in claim 5 wherein said cap is also sonically welded over said axial bore.

7. An automobile decklid pop-up bumper as claimed in claim 2 wherein said spring is a helical spring.

8. An automobile decklid pop-up bumper as claimed in claim 7 wherein said spring is of steel.

9. An automobile decklid pop-up bumper as claimed in claim 1 wherein said housing is molded from an elastomeric resin material.

10. An automobile decklid pop-up bumper as claimed in claim 9 wherein said elastomeric resin material is nylon.

11. An automobile decklid pop-up bumper as claimed in claim 1 wherein said plunger is molded from a polymeric resin material.

12. An automobile decklid pop-up bumper as claimed in claim 11 wherein said polymeric resin material is an acetal resin.

13. An automobile decklid pop-up bumper as claimed in claim 11 wherein said polymeric resin material is an nylon resin.

14. An automobile decklid pop-up bumper as claimed in claim 3 wherein said cap is molded from a reinforced polymeric resin material.

15. An automobile decklid pop-up bumper as claimed in claim 14 wherein said reinforced polymeric resin material is 30% glass-filled nylon black.

16. An automobile decklid pop-up bumper as claimed in claim 1 wherein said second plurality of abutment means on said shank portion comprises a plurality of discrete detent means on said helical thread of the shank portion.

17. An automobile decklid pop-up bumper as claimed in claim 1 wherein said enlarged end portion includes a raised generally spherical surface portion for engaging the hood.

* * * * *